April 18, 1939.  J. H. ADAMS  2,154,426
DEVICE TO INDICATE THE TEMPERATURE OF COOKING MEAT
Filed June 10, 1936
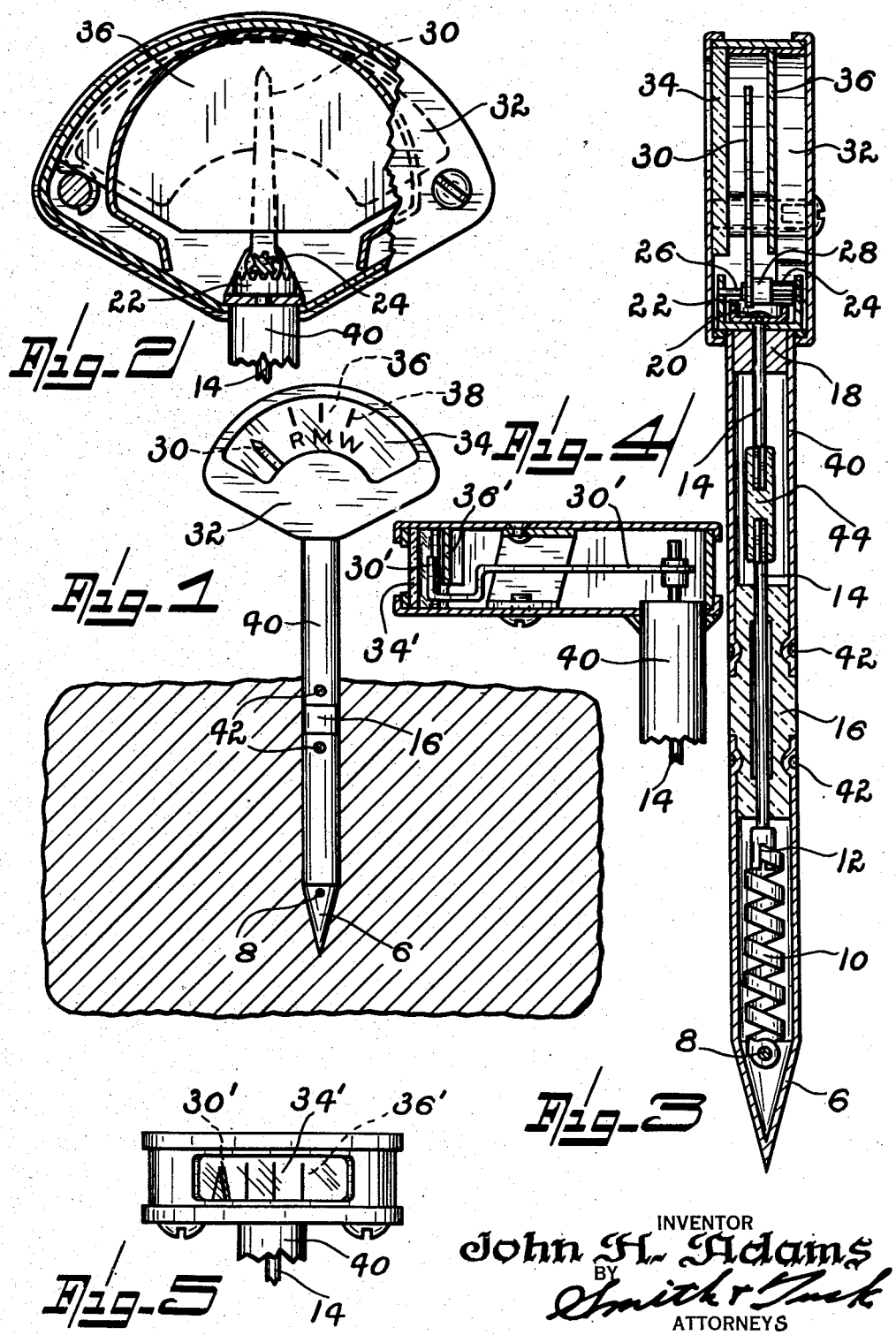
INVENTOR
John H. Adams
BY
Smith & Tuck
ATTORNEYS Patented Apr. 18, 1939

2,154,426

UNITED STATES PATENT OFFICE 2,154,426

DEVICE TO INDICATE THE TEMPERATURE OF COOKING MEAT

John H. Adams, Seattle, Wash.

Application June 10, 1936, Serial No. 84,554

3 Claims. (Cl. 73—352)

My present invention relates to the art of metallic thermometers and more particularly to a device to indicate the temperature of cooking meat.

One of the most trying problems encountered by the average housewife in the cooking of meat is to stop the cooking when the meat has reached the degree of cooking desired. Many persons like meat medium done, others like it rare, while a few prefer it well done. Now, the housewife is normally guided by tables which indicate that, for instance, a roast of a certain weight will require so many minutes cooking in an oven temperature of a certain degree of heat. This method takes into no account the thickness of the meat. So often, particularly for the smaller family, a roast will have considerable weight but may be only an inch and one-half or two inches thick. Under such conditions the weight and time method does not give an index to the proper temperature of the inner meat. Now, it has been definitely established that when meats reach a certain temperature, while being cooked, their condition can be exactly determined. For instance, when a roast of beef has been cooked until the center reaches a temperature of 140 degrees the roast should be removed if rare meat is desired; at 160 degrees, if a medium done center is desired; and at 180 degrees if the center is to be well done. Now, with my device I have taken into account these known facts and have produced a thermometer which is so shielded and protected that it can be relied upon to give accurate information and at the same time be so suitably housed that there is no danger of breaking the thermometer when placing it in the roast or during the roasting period.

Therefore, the principal object of my present invention is to provide a temperature indicating thermometer for insertion in meat, or any other cooked product during the period of cooking, and to be left in during that period.

A further object of my invention is to provide a thermometer so shielded and housed that an accurate transfer of heat is made from the object cooked to the thermometer and, further, that the thermometer itself will give an accurate reading even though a large portion of it be in an oven atmosphere having a temperature far in excess of the indicated thermometer temperature.

Other and more specific objects wil be apparent from the following description taken in connection with the accompanying drawing, wherein Figure 1 is an elevation of my device showing it inserted into a roast of meat, a cake, or loaf that is being cooked, the same being shown in section.

Figure 2 is a fragmentary, face view of the recording head of my device, certain parts being broken away to better illustrate the construction.

Figure 3 is a longitudinal, sectional view of my device, taken at right angles to the views of Figures 1 and 2.

Figure 4 is a simplification of my device in a modified form, the same being in elevation with certain parts broken away and shown in section.

Figure 5 is a fragmentary elevation of the recording head of the modified form of my device shown in Figure 4.

Referring to the drawing, throughout which like reference characters indicate like parts, 6 designates the point member of my device. This I prefer to form of metal and to sharply point the same so that it may be easily inserted in roasts, and the like. It is desirable that the member be made of metal to the end that maximum transfer of heat will be effected. Preferably, the metal should be of some non-corrosive alloy such as is commonly known as stainless steel or of the brasses containing a high percentage of nickel.

Fixedly secured to this point member as by a rivet or screw 8 is any suitably metallic thermometer unit. This may take the spiral metal form indicated, or may be any other suitable type that will change its shape appreciably with changes in temperature. Secured to the metallic thermometer element 10 by suitable means as by bifurcating and riveting indicated at 12, is a longitudinally disposed shaft 14 which is suitably journaled within bushing members 16 and 18. In the preferred form I have indicated a rod 14 as being fixedly secured at 20 to the skeletonized bevel gear 22. This gear in turn meshes with pinion 24 supported on shaft 26. Secured preferably to an extended hub 28 of gear 24 is the pointer or indicator 30. With the arrangement indicated it is believed it will be apparent that rotary movement of rod 14 will be magnified through the relatively large gear 22 meshing with the smaller pinion 24 and thus give a very appreciable movement to pointer 30.

Pointer 30 together with the gear mechanism is enclosed within housing 32 and the movement of pointer 30 is visible through a glass or other transparent window 34. A suitable scale of graduations may be placed on the window or preferably on an index plate 36, which is secured in housing 32 back of pointer 30 so that it will be readily readable through window 34. Any suitable graduations as 38 may be used to cooperate with pointer 30. In the present showing I have indicated 3 such graduations labeled R for rare, M for medium, and W for well done. It will be apparent that any suitable indications might be made, in fact the actual degrees of heat might be indicated and thus a scale of more universal application would be had, inasmuch as different types of meat require different temperatures for corresponding degrees of cooking.

In Figures 4 and 5 I have indicated a simplified form wherein rod 14 has a pointer 30" fixedly secured to it. This pointer may be employed, as is pointer 30, using a graduated scale 36' and an inspection window 34'. The virtue of this arrangement is its simplicity. On the other hand the amount of movement possible with this arrangement is somewhat limited and further the shape of the head lying normal to the axis of tube 40 makes it structurally weak and more easily damaged if not carefully handled.

It is particularly desired to point out a feature of construction which is believed to be essential in an indicating device of this character if it is to properly serve its intended purpose. This consists of thoroughly insulating so as to effectively prevent the transfer of heat between the point member 6 and the connecting metal tube 40 to which the upper housing and member 32 are secured. This is accomplished by means of an insulating tube or bushing 16. This tube may be of any suitable material such as certain compounds of Bakelite or asbestos. At present, however, the most desirable appears to be the vitreous materials which are now available that show no signs of breaking down at temperatures in excess of 1000 degrees Fahrenheit.

It has been found very desirable to provide a very definite stop at each end of bushing 16 so that tubes 6 and 40 will abut against its square shoulders substantially as indicated in Figure 3 in order that they will be in a position to resist the appreciable strain that occurs when the thermometer point is forced into an uncooked roast. In the drawing I have indicated a plurality of indentations as 42 which serve to secure the elements together.

The necessity for this thorough insulation between the recording, or indicating, portion of my device and the thermal element 10 will be apparent when it is realized that in cooking a roast it may be desirable to have temperatures in extent of 450 to 500 degrees Fahrenheit particularly when searing the meat. Yet the temperature of the inside of the roast which the thermometer is intended to read accurately, may not exceed 140 degrees. The point should be, at all times, embedded to about the position shown in Figure 1. The upper portion of the thermometer will be subjected to the maximum of the oven temperature. Under such conditions it is highly desirable that the thermometer casing does not transmit any heat down to the thermal unit, for to do so would clearly seriously affect the accuracy of the device. Following the same, though, it is desirable that rod 14 be of non-conductive material, or if metal admits of more ready manufacture, an insulating coupling may be employed as indicated at 44. In manufacturing a device of this order it has been found desirable to normally assemble the unit after the showing of Figures 1 and 3 and then to test them at different known temperatures and thus determine the accurate location of index lines 38.

The foregoing description and the accompanying drawing are believed to clearly disclose a preferred embodiment of the invention but it will be understood that this disclosure is merely illustrative and that such changes in the invention may be made as are fairly within the scope and spirit of the following claims.

I claim:

1. A thermometer for culinary use comprising a tubular housing formed with spaced upper and lower sections and having indicia on said upper section, a tubular insulating section between said housing sections, mechanical heat expansive means within the lower section of said housing, a temperature indicating pointer in said upper section actuated by said heat expansive means and non-conductive means operatively connecting said pointer and said expansive means.

2. A thermometer for culinary use comprising a housing having indicia thereon and formed with upper and lower sections, insulating means between said sections, a spiral heat expansive unit within said lower section, a temperature indicating pointer within said upper section, and a two part shaft for transmitting rotary motion from said spiral unit to said temperature indicator and an insulating coupling for said shaft.

3. A thermometer for culinary use comprising an upper metal housing of arcuate form having a transparent face with indicia thereon and a pointed lower metal housing, insulating means between said housings, a spiral heat expansive unit in said lower section having one end rigid with said section, a non-conductive motion transmitting shaft in engagement with the free end of said unit, a gear on the opposite end of said shaft, a laterally disposed shaft in said upper section engaging said gear, and temperature indicating means rigid with said lateral shaft.

JOHN H. ADAMS.